Patented May 4, 1954

2,677,696

UNITED STATES PATENT OFFICE 2,677,696

PROCESS FOR PRODUCING ARSANILIC ACID

James E. Rundell, Waukegan, and Frank F. Ferry, Jr., Prairie View, Ill., assignors to Abbott Laboratories, North Chicago, Ill., a corporation of Illinois No Drawing. Application September 19, 1951, Serial No. 247,356

7 Claims. (Cl. 260—442)

This invention relates to improvements in the manufacture of aryl arsonic acids and more particularly para-amino-phenyl-arsonic acid, commonly known as arsanilic acid. This compound is known to have utility for its physiological activity in the veterinary field as well as being useful as an intermediate in the preparation of various other organic arsenicals.

It is an object of this invention to provide an improved process of preparing arsanilic acid more efficiently and less expensively than by methods known to the prior art.

It is a further object of this invention to provide a process of preparing arsanilic acid whereby the unreacted ingredients of said process are recovered in an essentially pure state suitable to be reused in subsequent production of arsanilic acid.

It is a further object of this invention to provide a process of preparing arsanilic acid which gives a relatively pure crude product, thereby reducing subsequent purification costs.

Other objects and advantages of the invention will become apparent from the following description, which is solely for the purpose of illustration and is not intended to limit the scope of the invention nor of the appended claims.

Many processes for the preparation of arsanilic acid from aniline and arsenic acid have been described in the literature, but they are, in general, costly and complex, i. e., Journal of the American Chemical Society, volume 41, page 452 (1919) of Kober and Davis. This publication discloses a method which involves refluxing the products of the reaction between arsenic acid and aniline, first at 160–170° C. for approximately one hour and subsequently at 180–185° C. for approximately one hour; followed by the dissolution of the reaction product in an aqueous solution of sodium hydroxide. The sodium hydroxide solution layer formed is separated from the layer of excess aniline. Finally, the sodium hydroxide solution is neutralized with hydrochloric acid, thereby causing the arsanilic acid to precipitate out of solution. This process gives a 10–30% yield and provides no economical way to recover the unreacted intermediates. The intermediates are expensive and not too plentiful, and thus their recovery is important.

The improved process of the present invention, as described below, simplifies the method of manufacture of arsanilic acid by entirely eliminating the use of an alkali or an acid in the recovery of the arsanilic acid from the reaction mixture. The process permits the recovery of arsanilic acid in excellent yields and permits the recovery of unreacted arsenic acid in a relatively pure state suitable for reuse in subsequent batches with addition of aniline. The arsenic acid, which is recovered, is undoubtedly in the form of some salt of aniline, but, upon heating in the initial reaction with additional aniline, will form arsanilic acid. In the prior art, it was necessary to resort to the use of alkali to first prepare an alkali salt of arsanilic acid in order to remove the aniline and liberate the arsanilic acid. The alkali salt of arsanilic acid must then be treated with acid to form free arsanilic acid. This method, in addition to being more involved and, therefore, more costly, increases the difficulties of purification and makes totally prohibitive the reuse of unreacted arsenic acid.

In the present invention, we have simplified the recovery of the desired arsanilic acid which results from the inter-reaction of arsenic acid and an excess of aniline in a heated reaction vessel. Our invention involves the addition of substantially pure water to the products of the above reaction, thereby causing the solution to separate into layers. The top layer contains excess aniline and tarry by-products, whereas the lower water layer contains in solution, aniline arsenate and aniline arsanilate. After several water extractions to insure complete recovery of the solution aniline arsanilate and aniline arsenate, the various water extractions are combined. We have discovered that the arsanilic acid may be caused to precipitate out of this solution which is alkaline, due to the fact that the two acids are in the form of the aniline salts, by splitting said aniline salts form the solution in either of two ways, i. e., steam distillation or extraction with a water immiscible organic solvent in which aniline is soluble. We prefer benzol but other aromatic hydrocarbon solvents, such as toluene and the xylenes are also satisfactory. So are ether, chloroform, and carbon tetrachloride; water insoluble alcohols such as butanol, pentanol, etc.; and water insoluble esters such as amyl acetate and butyl acetate. Either of these methods will result in lowering the pH of the solution to such a point that arsanilic acid will be precipitated therefrom and may be recovered by the usual process of filtration. It is preferable to lower the pH to between 2.0 and 3.5. The arsenic acid liberated is soluble and, upon concentration of the aqueuos solution by evaporation, the arsenic acid may be reused.

As has been stated above, the prior art processes require the addition of alkali to the reaction melt to remove the arsanilic acid from the reaction mixture. Our process permits the use of a simplified procedure for the isolation of the arsanilic acid without adding further contaminants and permits reuse of the unreacted intermediates.

The present invention may be illustrated by the following examples:

Example I

To about 500 cc. of aniline are added 190 grams of arsenic acid (75%) with stirring in a heated reaction vessel. The temperature of the reaction mass is brought to 165° C. and maintained thereat for about one and a half hours. During this time approximately 50 cc. of water formed in the reaction will be removed by distillation. The mixture is cooled, and 400 cc. of water are added to the reaction mass which then separates into two layers, the lower water layer containing in solution aniline arsenate and aniline arsanilate, whereas the upper layer is composed of excess aniline and tarry by-products. The lower or water layer is drawn off and combined with successive similar water extractions using 100 cc. and 50 cc. of water respectively. About 200 cc. of benzol are intimately mixed with the combined water extractions, allowed to separate, and the benzol solution withdrawn. This latter process is repeated three times, and the combined benzol extracts, containing aniline, are discarded. The water extraction is then concentrated to a volume of about 250 cc. by evaporation. Precipitation of the arsanilic acid is completed by stirring and cooling to room temperature. The arsanilic acid is then filtered and washed with water and acetone. The weight of the crude arsanilic acid thus obtained is 83 grams. The arsanilic acid may be further purified by the usual method of recrystallization from hot water. The filtrate from which the aniline and arsanilic acid have been removed may be concentrated by evaporation and used again for its arsenic acid content.

Example II

The combined water extraction as obtained in Example I are subjected to steam distillation at atmospheric pressure and concentrated until the volume is approximately 300 cc. The pH of the solution at this time was noted to be 2.5. Crystallization of the arsanilic acid was brought about by stirring and cooling to room temperature. The weight of the crude arsanilic acid thus obtained is 80 grams. Here again the aqueous concentrate, after removal of the aniline and the arsanilic acid, may be used as arsenic acid after further evaporation by condensing with aniline as in the initial reaction.

Others may readily adapt the invention for use under various conditions of service by employing one or more of the novel features disclosed, or equivalents thereof. As at present advised with respect to the apparent scope of our invention, we desire to claim the following subject matter.

We claim:

1. In the process of producing arsanilic acid by the reaction of arsenic acid with an excess of aniline, the novel purification procedure comprising the steps of adding water to the reaction mixture, separating the aqueous phase, removing aniline from said aqueous phase in the form of the free base thereby reducing the pH of said aqueous phase to the point where arsanilic acid will precipitate, precipitating arsanilic acid, and recovering said arsanilic acid from the resulting slurry.

2. The process according to claim 1, whereby the aniline is removed from the aqueous extract by steam distillation.

3. The process according to claim 1, whereby the aniline is removed from the aqueous extract by extraction with a water immiscible organic solvent in which the aniline is soluble.

4. The process according to claim 3 in which the organic solvent is benzol.

5. The process according to claim 1 wherein the acidity of the aqueous extract is lowered to a pH of 2 to 3.5.

6. In the process of producing arsanilic acid by the reaction of arsenic acid with an excess of aniline, the novel steps comprising the addition of water to the reaction mixture, the separation of the water layer from said excess aniline, the partial removal of aniline from said water layer by means of steam distillation, cooling the residue of said partial distillation to cause precipitation of arsanilic acid, and recovery of said arsanilic acid by means of filtration.

7. In the process of producing arsanilic acid by the reaction of arsenic acid with an excess of aniline, the novel steps comprising the addition of water to the reaction mixture, the separation of the water layer from said excess aniline, the partial removal of aniline from said water layer by means of extraction with a water-immiscible organic solvent in which aniline is soluble to cause precipitation of arsanilic acid, and recovery of said arsanilic acid by means of filtration.

References Cited in the file of this patent

UNITED STATES PATENTS

| Number | Name | Date |
|---|---|---|
| 1,405,228 | Kober | Jan. 31, 1922 |

FOREIGN PATENTS

| Number | Country | Date |
|---|---|---|
| 28,361 of 1909 | Great Britain | July 1910 |

OTHER REFERENCES

Organic Synthesis, vol. III, pages 13–16 (1923), John Wiley and Sons, New York city.